(12) United States Patent
Boyadjiev et al.

(10) Patent No.: US 10,593,336 B2
(45) Date of Patent: Mar. 17, 2020

(54) MACHINE LEARNING FOR AUTHENTICATING VOICE

(71) Applicants: ACCENTURE GLOBAL SOLUTIONS LIMITED, Dublin (IE); MISRAM LLC, Holmdel, NJ (US)

(72) Inventors: Constantine T. Boyadjiev, Jersey City, NJ (US); Rajarathnam Chandramouli, Holmdel, NJ (US); Koduvayur Subbalakshmi, Holmdel, NJ (US); Zongru Shao, Jersey City, NJ (US)

(73) Assignees: ACCENTURE GLOBAL SOLUTIONS LIMITED, Dublin (IE); MISRAM LLC, Holmdel, NJ (US)

( * ) Notice: Subject to any disclaimer, the term of this patent is extended or adjusted under 35 U.S.C. 154(b) by 19 days.

(21) Appl. No.: 16/046,626

(22) Filed: Jul. 26, 2018

(65) Prior Publication Data

US 2020/0035247 A1 Jan. 30, 2020

(51) Int. Cl.
| | |
|---|---|
| G10L 15/00 | (2013.01) |
| G10L 17/22 | (2013.01) |
| G10L 17/18 | (2013.01) |
| G10L 17/04 | (2013.01) |
| G10L 17/06 | (2013.01) |
| G10L 17/02 | (2013.01) |
| G10L 15/16 | (2006.01) |

(52) U.S. Cl.
CPC ............ *G10L 17/22* (2013.01); *G10L 17/02* (2013.01); *G10L 17/04* (2013.01); *G10L 17/06* (2013.01); *G10L 17/18* (2013.01)

(58) Field of Classification Search
CPC ......... G10L 17/22; G10L 17/06; G10L 17/18; G10L 17/04; G10L 17/02

USPC ......................................................... 704/232
See application file for complete search history.

(56) References Cited

U.S. PATENT DOCUMENTS

2008/0010065 A1   1/2008   Bratt et al.

OTHER PUBLICATIONS

Novoselov, et al., "STC Anti-spoofing systems for the ASVspoof 2015 challenge", In: Acoustics, Speech and Signal Processing (ICASSP), 2016 IEEE International Conference on. IEEE, pp. 5475-5479.
Tian, et al., "An Investigation of spoofing speech detection under additive noise and reverberant conditions", Interspeech 2016, Sep. 8-12, 2016, pp. 1715-1719.
Todisco, et al., "Constant Q cepstal cofeeicients: A spoofing countermeasure for automatic speaker verification", Computer Speech & Language 45 (2017), pp. 516-535.

(Continued)

*Primary Examiner* — Thierry L Pham
(74) *Attorney, Agent, or Firm* — Mannava & Kang, P.C.

(57) ABSTRACT

A machine learning multi-dimensional acoustic feature vector authentication system, according to an example of the present disclosure, builds and trains multiple multi-dimensional acoustic feature vector machine learning classifiers to determine a probability of spoofing of a voice. The system may extract an acoustic feature from a voice sample of a user. The system may convert the acoustic feature into multi-dimensional acoustic feature vectors and apply the multi-dimensional acoustic feature vectors to the multi-dimensional acoustic feature vector machine learning classifiers to detect spoofing and determine whether to authenticate a user.

20 Claims, 10 Drawing Sheets

(56) References Cited

OTHER PUBLICATIONS

Wu, et al., "Asvspoof 2015: the first automatic speaker verification spoofing and countermeasures challenge", In: Sixteenth Annual Conference of the International Speech Communication Association, Interspeech2015, 5 pages.

Xiao, et al., Spoofing speech detection using high dimensional magnitude and phase features: The NTU System for ASVspoof 2015 challenge. In: Sixteenth Annual Conference of the International Speech Communication Association, Sep. 2015, 6 pages.

Zhang Chunlei et al., "An Investigation of Deep-Learning Frameworks for Speaker Verification Antispoofing", IEEE Journal of Selected topics in Signal Processing, vol. 11, No. 4, Jan. 16, 2017, pp. 684-694.

Mayalu Alfred K et al., :Unattended sensor using deep machine learning techniques for rapid response applications, Proceedings of SPIE, vol. 10643, May 3, 2018, pp. 106430B1-106430B12.

Dinkel Heinrich et al., "Small-footprint convolutional neural network for spoofing detection", 2017 International Joint Conference on Neural Networks, IEEE, May 14, 2017, pp. 3086-3091.

Saranya M S et al., "Replay Attack Detection in Speaker Verification Using non-voiced segments and Decision Level Feature Switching", 2018 International Conference on Signal Processing and Communications, IEEE, Jul. 16, 2018, pp. 332-336.

European Patent Office, "the extended European search report", EP application No. 19188109.3, dated Nov. 12, 2019. 2 pages.

|  | SPECTROGRAM (RGB) | SPECTROGRAM (GREYSCALE) | MFCC (RGB) | MFCC (GREYSCALE) | TEMPO-GRAM (RGB) | TEMPO-GRAM (GRAYSCALE) | TONNETZ (RGB) | TONNETZ (GRAYSCALE) |
|---|---|---|---|---|---|---|---|---|
| Human | EXCELLENT | EXCELLENT | EXCELLENT | EXCELLENT | ACCEPTABLE | ACCEPTABLE | GOOD | GOOD |
| S1 | EXCELLENT | EXCELLENT | EXCELLENT | EXCELLENT | EXCELLENT | EXCELLENT | GOOD | GOOD |
| S2 | EXCELLENT | EXCELLENT | ACCEPTABLE | ACCEPTABLE | LOW | LOW | ACCEPTABLE | ACCEPTABLE |
| S3 | EXCELLENT | EXCELLENT | EXCELLENT | EXCELLENT | EXCELLENT | EXCELLENT | EXCELLENT | EXCELLENT |
| S4 | EXCELLENT | EXCELLENT | EXCELLENT | EXCELLENT | EXCELLENT | EXCELLENT | EXCELLENT | EXCELLENT |
| S5 | EXCELLENT | EXCELLENT-A | ACCEPTABLE | ACCEPTABLE | LOW | LOW | ACCEPTABLE | ACCEPTABLE |
| S6 | EXCELLENT | EXCELLENT-A | LOW | LOW | LOW | LOW | LOW | LOW |
| S7 | EXCELLENT | EXCELLENT | ACCEPTABLE | EXCELLENT | LOW | LOW | ACCEPTABLE | ACCEPTABLE |
| S8 | EXCELLENT | EXCELLENT | LOW | LOW | MEDIUM | MEDIUM | GOOD | GOOD |
| S9 | EXCELLENT | EXCELLENT | ACCEPTABLE | MEDIUM | LOW | LOW | ACCEPTABLE | ACCEPTABLE |
| S10 | LOW | LOW | LOW | MEDIUM | EXCELLENT | EXCELLENT-A | LOW | ACCEPTABLE |

*FIGURE 6*

MACHINE LEARNING FOR AUTHENTICATING VOICE

BACKGROUND

Voice authentication typically involves receiving and storing a base sample of a voice as a reference voice. Subsequently requests to authenticate an individual involve comparing the reference voice to a sample obtained during the authentication request. Voice authentication systems are used for example to access computer systems to retrieve information such as during banking.

However, a sample obtained during the authentication request may be a spoofed voice such as a synthesized voice or a converted voice. The spoofed voice may be generated using various algorithms designed to emulate the voice of a user. Thus, many conventional voice-based authentication systems are highly susceptible to spoofing.

BRIEF DESCRIPTION OF THE DRAWINGS

Features of the present disclosure are illustrated by way of example and not limited in the following figure(s), in which like numerals indicate like elements, in which:

FIG. 6 shows an example of the probability of detecting spoofing using the output of the plurality of multi-dimensional acoustic feature vector convolutional neural networks (CNNs), according to an example of the present disclosure;

DETAILED DESCRIPTION

Figure 1:
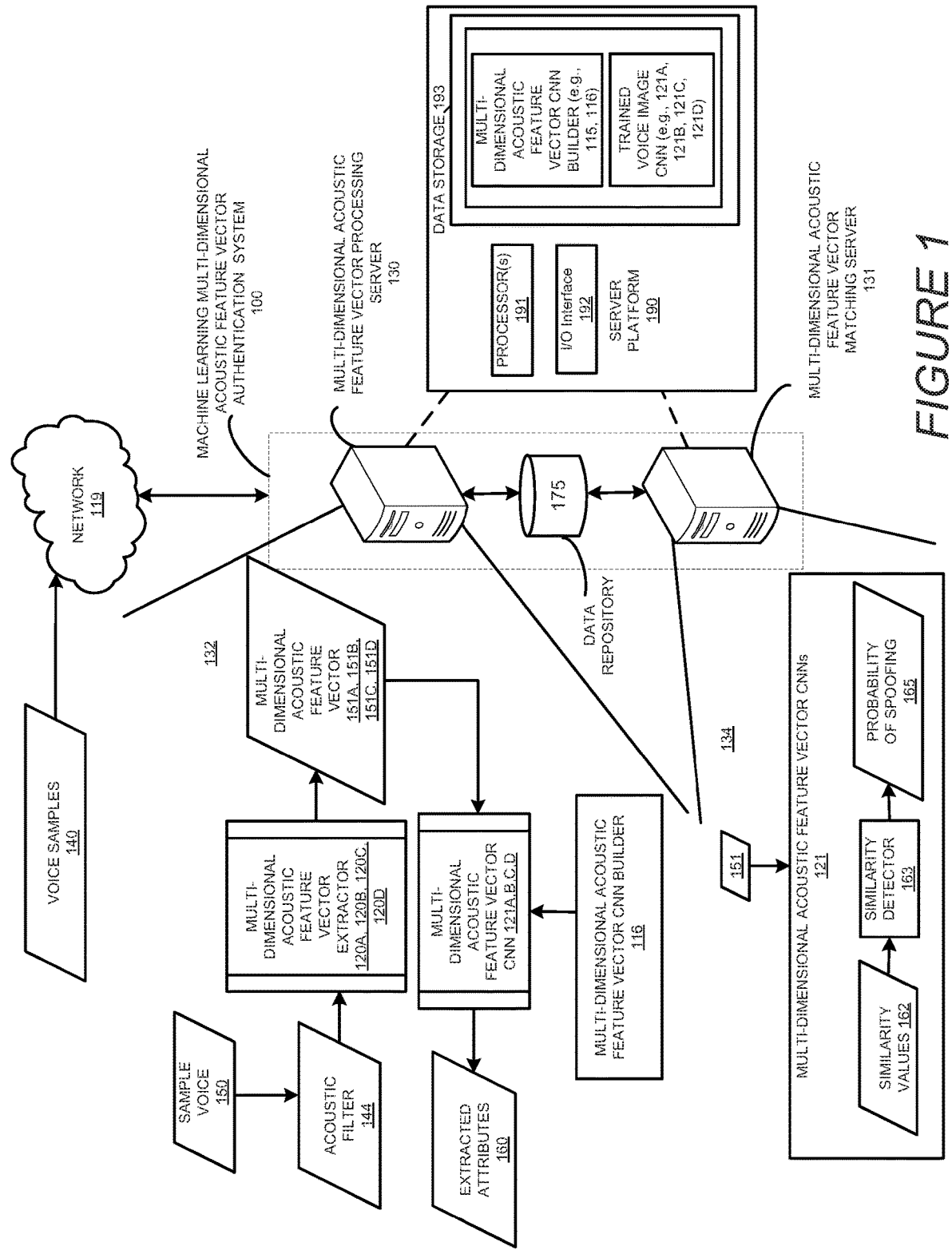
FIG. 1 shows a system diagram of a machine learning multi-dimensional acoustic feature vector authentication system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

A machine learning multi-dimensional acoustic feature vector authentication system, according to an example of the present disclosure, builds and trains multiple multi-dimensional acoustic feature vector machine learning classifiers, such as convolutional neural networks, to determine a probability of spoofing a voice.

To determine the probability of voice spoofing, the system may extract an acoustic feature from a voice sample of a user. For example, an acoustic feature may be a part of the voice sample that contains a human voice separated from background noise or pauses. The system may convert the acoustic feature into a plurality of multi-dimensional acoustic feature vectors. In an example, a multi-dimensional acoustic feature vector may represent voice attributes in the voice sample in a visual form. The system may apply each multi-dimensional acoustic feature vector in the plurality of multi-dimensional acoustic feature vectors to a corresponding trained multi-dimensional acoustic feature vector machine learning classifier to determine a probability of spoofing of each multi-dimensional acoustic feature vector. The system may then determine an overall probability of spoofing for the voice sample based on the probabilities of spoofing of the plurality of multi-dimensional acoustic feature vectors. For example, the overall probability of spoofing of the multi-dimensional acoustic feature vector may be an aggregate of the probability of spoofing of each multi-dimensional acoustic feature vector. The system may then authenticate a user when the probability of spoofing is within a certain threshold. In an example, a certain threshold may be an overall probability of spoofing being greater than 0.8 in a scale or of 0 to 1.

The system may include an acoustic filter to convert the acoustic feature into the multi-dimensional acoustic feature vectors, and the machine learning classifiers can perform image processing to detect spoofing by analyzing visual attributes of the multi-dimensional acoustic feature vectors. The visual attributes may be associated with the voice attributes of the voice sample and may be used for image matching to identify subtle changes in the acoustic feature that may sound similar but may include visual dissimilarities. In an example, the machine learning multi-dimensional acoustic feature vector authentication system may authenticate the speaker against spoofing attacks. Examples of spoofing attacks may include voice conversion, synthetic speech, replay attacks and impersonation attacks.

The CNNs may include many layers to detect and classify particular features of the multi-dimensional acoustic feature vectors relevant for authentication. Furthermore, each layer of a CNN typically has a multitude of parameters associated with it. The specific values of those parameters necessary for a successful and accurate multi-dimensional acoustic feature vector classification may not be known a priori. The machine learning multi-dimensional acoustic feature vector authentication system, according to an example, provides a method for building and training CNNs that contain a multi-dimensional acoustic feature vector model to output an accurate classification of the multi-dimensional acoustic feature vector for detecting the probability of spoofing.

According to an example of the present disclosure, the multi-dimensional acoustic feature vector extractor may generate the plurality of multi-dimensional acoustic feature vectors using various acoustic feature extraction algorithms such as a Short-Time Fourier Transformation, a Mel-Frequency Cepstral Coefficient Transformation, a Tempo-gram Feature transformation and/or a Tonnetz space geometric transformation. Also, the CNNs may include multiple CNN models that are each specific to a multi-dimensional acoustic feature vector generated by a specific one of the acoustic feature extraction algorithms. For example, a first CNN built and trained by the machine learning multi-dimensional acoustic feature vector authentication system may be trained on multi-dimensional acoustic feature vectors generated using the Short-Time Fourier Transformation. The trained CNN may include a multi-dimensional acoustic feature vector model trained on multi-dimensional acoustic feature vectors generated using the Short-Time Fourier Transformation. A second CNN may be built and trained using multi-dimensional acoustic feature vectors generated using the Mel-Frequency Cepstral Coefficient Transformation, the Tempo-gram Feature transformation or the Tonnetz space geometric transformation. The machine learning multi-dimensional acoustic feature vector authentication system may identify objects in the target image, that may indicate spoofing.

In an example, the plurality of CNN's built and trained by the machine learning multi-dimensional acoustic feature vector authentication system may determine visual attributes of a multi-dimensional acoustic feature vector. In an example, a visual attribute of the multi-dimensional acoustic feature vector may be compared to visual attributes of stored images to find similar images in a multi-dimensional acoustic feature vector matching process. The visual attributes are high-level abstractions of features such as ridges, peaks, and valleys in the multi-dimensional acoustic feature vector represented by vectors of numeric values that may include visual features of an image.

The examples of the present disclosure are generally associated with voice authentication using machine learning. A technical problem associated with voice authentication is the possibility of spoofing of a voice to circumvent the system security. A voice may be spoofed by synthetically generating a voice or by modifying a voice to sound like the spoofed voice. For example, spoofing algorithms may generate a voice based on phenomes or other divisions of the sound based on voice models. For example, text to speech technologies used in computers generate voices based on voice models. In another example, spoofing algorithms may generate a voice by modifying the characteristics of the voice recording of another human. For example, the voice of user A may be generated from the voice of user B by modifying the voice of user B with the voice attributes of user A. The system described in further detail below can determine whether a voice sample has been spoofed.

Another technical problem associated with voice authentication is that different voice spoofing algorithms may generate different voice samples that are close to human voices of the actual users in a certain voice attribute. If a system relies on that voice attribute, the system may allow access when a spoofed voice with the certain voice attribute is received. The system described in further detail below may use a plurality of multi-dimensional acoustic feature vector models that may detect the changes to different voice attributes instead of a certain voice attribute. For example, the multi-dimensional acoustic feature vectors are generated using multiple voice extraction algorithms.

With reference to FIG. 1, there is shown a system diagram of a machine learning multi-dimensional acoustic feature vector authentication system 100, according to an example of the present disclosure. The system 100 is referred to as machine learning because it may use machine learning functions to generate classifiers to detect voice spoofing during voice authentication. Examples of machine learning classifiers that may be created and used in the system 100 are CNNs, as is further discussed below. It should be understood that the system 100 may include additional components and that one or more of the components described herein may be removed and/or modified without departing from a scope of the system 100. The system 100 may include a multi-dimensional acoustic feature vector processing server 130, a multi-dimensional acoustic feature vector matching server 131 and a data repository 175.

The system 100 may receive voice samples 140, and the voice samples 140 may be stored in the data repository 175. The voice samples 140 may be received via communications network 119. The voice samples 140 may be provided in files, e.g., Way, MP3 or MP4 files. The voice samples 140 may be provided in audio files and generated from one or more frames of digital audio. The voice samples 140 may be provided by any number of sources.

The communications network 119 may include local area networks (LANs) and wide area networks (WANs), such as the Internet. The communications network 119 may include signal-bearing mediums that may be controlled by software, applications and/or logic. The communications network 119 may include a combination of network elements to support data communication services. The communications network 119 may encompass wired and/or wireless network technologies.

Examples of operations performed by the multi-dimensional acoustic feature vector processing server 130 are shown at 132. For example, the multi-dimensional acoustic feature vector processing server 130 may include an acoustic filter 144. The acoustic filter may extract a part of the sample voice 150 from a data storage 193 to generate an acoustic feature during training. An acoustic feature may be a human voice in the voice sample. For example, a human being may take time to respond when asked to provide a voice sample. There may be a background disturbance during the voice sample generation process, or they may be pauses in the voice sample. The acoustic filter may remove these and normalize the voice sample.

The acoustic filter 144 may for example crop a file to generate segments of a certain duration. For example, the acoustic filter 144 may generate a file of 4 seconds. In an example, the acoustic filter 144 may extract human voice from the sample voice 150. For example, the sample voice 150 may include pauses or background noise. The acoustic filter 144 may crop the audio file to generate a part of the audio file that contains the human voice, i.e., an acoustic feature 133. The acoustic feature extracted by the acoustic filter 144 may be fed to the multi-dimensional acoustic feature vector extractor 120A, 120B, 120C, 120D (collectively a plurality of multi-dimensional acoustic feature vector extractors 120). The plurality of multi-dimensional acoustic feature vector extractors 120 may generate a plurality of multi-dimensional acoustic feature vectors 151 (shown as 151A, 151B, 151C, and 151D). In an example, the multi-dimensional acoustic feature vector extractor 120A, 120B, 120C, 120D may after training receive the voice sample 140 from the network through the multi-dimensional acoustic feature vector matching server 131. The multi-dimensional acoustic feature vector extractor 120 may feed a multi-dimensional acoustic feature vector 151A, 151B, 151C, 151D to the CNN 121A, 121B, 121C and/or 121D (collectively a plurality of multi-dimensional acoustic feature vector CNNs. 121).

The plurality of multi-dimensional acoustic feature vector CNNs may produce extracted attributes 160 from the plurality of multi-dimensional acoustic feature vectors 151.

Examples of extracted attributes 160 may include a probability of spoofing of a multi-dimensional acoustic feature vector, the differences between the multi-dimensional acoustic feature vectors of a spoofed sample and a human voice and the like. For example, a spoofed voice may include peaks or valleys not found in human voice or may be of a particular frequency, may have a different profile in peaks and the like. The plurality multi-dimensional acoustic feature vector CNNs 121 may extract these features to identify spoofed voices such as voice attributes that correspond to spoofed voices.

In an example, the multi-dimensional acoustic feature vector CNN builder 116 may train the plurality of multi-dimensional acoustic feature vector CNNs 121 using test datasets.

Test datasets and validation sets may be created, for example, from the voice samples 140 or other digital audio, and may be used to build and validate the multi-dimensional acoustic feature vector CNN 121. Each multi-dimensional acoustic feature vector CNN in the plurality of multi-dimensional acoustic feature vector CNNs 121, for example, is trained to identify voice attributes in the plurality of multi-dimensional acoustic feature vectors 151 such as the probability of spoofing based on multi-dimensional acoustic feature vectors that are generated using a certain multi-dimensional acoustic feature vector generating algorithm. In an example, the CNN may be trained to recognize extracted attributes 160 based on classes (i.e., categories) of objects in multi-dimensional acoustic feature vectors and locations of the objects in the multi-dimensional acoustic feature vectors. The training data for the multi-dimensional acoustic feature vector CNN 121 may include multi-dimensional acoustic feature vectors that are extracted from sample voice 150. The sample voice 150 may be a human voice or a synthesized voice. During training, the training data sets may include a human voice of a user, and a spoofed voice generated using known spoofing algorithms. In an example, the multi-dimensional acoustic feature vector 151, may have one or more voice attributes, a class for each voice attribute. The plurality of multi-dimensional acoustic feature vector CNNs 121 may be trained to generate a bounding box where the size and location of the bounding box in the multi-dimensional acoustic feature vector may identify the location of the voice attribute in the multi-dimensional acoustic feature vector that is dissimilar between the human voice and the spoofed voice in the spoofed voice. Once trained the multi-dimensional acoustic feature vector CNN 121A, 121B, 121C, 122D may provide a percentage or a probability of spoofing for the sample voice 150 for each corresponding multi-dimensional acoustic feature vector.

After building the plurality of multi-dimensional acoustic feature vector CNNs 121, the plurality of trained voice CNNs 121 may be used to identify voice attributes in the multi-dimensional acoustic feature vectors to distinguish the spoofed attributes from human voice attributes. Sample voice 150 is a sample provided as input to the acoustic filter 144. In an example, the acoustic filter 144 may after training of the plurality of multi-dimensional acoustic feature vector CNNs receive the voice sample 140 from the network through the multi-dimensional acoustic feature vector matching server 131.

As described above, the multi-dimensional acoustic feature vector 151A, 151B, 151C, 151D may be fed to the multi-dimensional acoustic feature vector CNN 121A, 121B, 121C, 121D. In an example, the multi-dimensional acoustic feature vector CNN 121A, 121B, 121C, 121D may process the corresponding multi-dimensional acoustic feature vector to determine areas or regions in the multi-dimensional acoustic feature vector that are dissimilar from the multi-dimensional acoustic feature vector sample of a user. The multi-dimensional acoustic feature vector CNN 121A, 121B, 121C, 121D may then determine the probability of spoofing of the multi-dimensional acoustic feature vector. In an example, the multi-dimensional acoustic feature vector of a spoofed multi-dimensional acoustic feature vector may have multi-dimensional acoustic feature vector attributes that are not present in the multi-dimensional acoustic feature vectors of a human multi-dimensional acoustic feature vector.

A multi-dimensional acoustic feature vector CNN builder 116 trains the plurality of multi-dimensional acoustic feature vector CNNs 121. Test datasets and validation sets may be created, for example, from the voice samples 140 or other voice samples and may be used to build and validate the plurality of multi-dimensional acoustic feature vector CNNs 121. The multi-dimensional acoustic feature vector CNN 121, for example, is trained to identify classes (i.e., categories) of multi-dimensional acoustic feature vectors.

After building the plurality of multi-dimensional acoustic feature vector CNNs 121, the plurality of multi-dimensional acoustic feature vector CNNs 121 may be used to determine voice attributes of multi-dimensional acoustic feature vectors. Based on the multi-dimensional acoustic feature vector attributes, the probability of spoofing of the audio sample may be determined. For example, each multi-dimensional acoustic feature vector from the plurality of multi-dimensional acoustic feature vectors 151 is provided as input to the corresponding multi-dimensional acoustic feature vector CNN 121. The multi-dimensional acoustic feature vector CNN 121 generates a probability of whether the extracted image 151 is in a class for which it was trained, e.g., is it spoofed or not, does it contain a spoofing voice feature or not and the like.

Examples of operations performed by the multi-dimensional acoustic feature vector matching server 131 are shown at 134. The multi-dimensional acoustic feature vector matching server 131 can compare the plurality of multi-dimensional acoustic feature vectors 151 to other images to identify images that are similar to the plurality of multi-dimensional acoustic feature vector 151. For example, voice attributes of the multi-dimensional acoustic feature vectors may be compared to determine how similar the multi-dimensional acoustic feature vectors are to each other. The multi-dimensional acoustic feature vectors being compared to the plurality of multi-dimensional acoustic feature vectors 151 and/or multi-dimensional acoustic feature vector data for those multi-dimensional acoustic feature vectors, including their voice attributes, may be stored in the data repository 175. The multi-dimensional acoustic feature vector matching server 131 may include the trained multi-dimensional acoustic feature vector CNN 121A, 121B, 121C, 121D. In an example, to determine the similarity between the plurality of multi-dimensional acoustic feature vectors 151 and attributes of another image (e.g., a human voice of the user or a spoofed voice sample), a Hamming distance may be calculated.

The plurality of multi-dimensional acoustic feature vector CNNs 121 (after training) may perform the steps shown from 162 to 165 to determine a probability of spoofing. The Hamming distance is an example of a similarity value. In an example, the multi-dimensional acoustic feature vectors may be similar when the multi-dimensional acoustic feature vectors are located close to each other in an n-dimensional vector space in a multi-dimensional acoustic feature vector model. A similarity detector 163 determines from the similarity values of a set of one or similar multi-dimensional acoustic feature vectors from the data storage 193 that are visually similar to the multi-dimensional acoustic feature vector 151A, 151B, 151C, 151D. For example, images associated with the "n" smallest Hamming distances are identified as images visually similar to the multi-dimensional acoustic feature vector 151A, 151B, 151C, 151D, where "n" is an integer greater than or equal to one. Determining the similar images (e.g., spoofed multi-dimensional acoustic feature vectors) that are the most similar to the multi-dimensional acoustic feature vector 151A, 151B, 151C, 151D may be used for detecting a spoof. For example, the plurality of multi-dimensional acoustic feature vector CNNs 121 may extract or identify features that appear in spoofed multi-dimensional acoustic feature vectors, identify features that are present in human voices but absent in spoofed images and the like. In another example, similar images but not exact images are identified by the multi-dimensional acoustic feature vector matching server 131 may be used to determine voice spoofing based on unknown voice spoofing algorithms.

Server platform 190 is an example of hardware that may be used in the image processing server 130, image matching server 131 or other servers described herein. It should be understood that the server platform 190 may include additional components and that one or more of the components described herein may be removed and/or modified as is known to one of ordinary skill in the art.

The server platform 190 may include one or more processors 191, data storage 193, and an input/output (I/O) interface 192. The components of the server platform 190 are shown on a single computer or server as an example, and in other examples, the components may exist on multiple computers or servers. The server platform 190 may store data in the data storage 193 and/or may manage the storage of data stored in a separate computing device, for instance, through the I/O interface 192. The data storage 193 may include physical memory, a hard drive, an optical drive, a flash drive, an array of drives, or any combinations thereof, and may include volatile and/or non-volatile data storage.

The processor 191, which may comprise a microprocessor, a micro-controller, an application specific integrated circuit (ASIC), Graphical Processing Unit (GPU) or the like, is to perform various processing functions of the respective server. The processing functions performed by the multi-dimensional acoustic feature vector processing server 130 and the multi-dimensional acoustic feature vector matching server 131, and other functions, operations and methods described herein may be embodied as machine readable instructions 194 that are stored in a non-transitory computer readable medium, such as the data storage 193, and executed by a processor, such as processor 191. In addition to storing the machine readable instructions 194, the data storage 193 may store data or functions, such as the multi-dimensional acoustic feature vector CNN 121. The multi-dimensional acoustic feature vector processing server 130 and the multi-dimensional acoustic feature vector matching server 131 are shown as separate servers. However, the functions and operations of these servers may be performed on a single server or multiple servers which may be connected via a network.

The I/O interface 192 includes a hardware and/or a software interface. The I/O interface 192 may be a network interface connected to a network through a network device, such as a router. For example, the I/O interface 192 may be a wireless local area network (WLAN) or a network interface controller (NIC). The WLAN may link to the network device through a radio signal. Similarly, the NIC may link to a network device through a physical connection, such as a cable.

The data repository 175 may include a database comprised of database tables or another type of data storage system. The data repository 175 can be implemented as a standalone or distributed repository.

Figure 2:
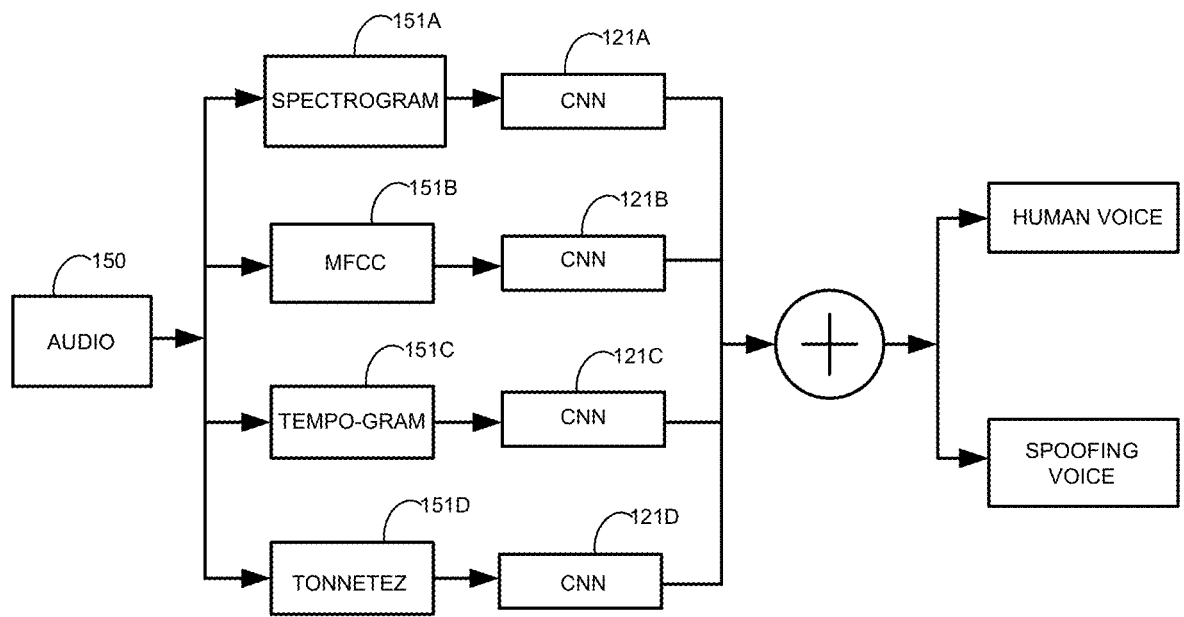
FIG. 2 shows a data flow for the machine learning multi-dimensional acoustic feature vector authentication system, according to an example of the present disclosure.

FIG. 2 shows an example of data flow in the system 100 described above. In an example, the sample voice 150 may be converted into a plurality of multi-dimensional acoustic feature vectors 151. For example, the audio sample 150 may be converted into acoustic features. The acoustic features may then be converted into visual representations in the form of a plurality of multi-dimensional acoustic feature vectors 151 (shown as 151A, 151B, 151C, and 151D). In an example, the plurality of multi-dimensional acoustic feature vectors 151 may be generated using the Short-Time Fourier Transformation, the Mel-Frequency Cepstral Coefficient Transformation, the Tempo-gram Feature and/or the Tonnetz space geometric representation. In the figure the multi-dimensional acoustic feature vector 151A is generated using the Short-Time Fourier Transformation, the multi-dimensional acoustic feature vector 151B is generated using the Mel-Frequency Cepstral Coefficient Transformation, the multi-dimensional acoustic feature vector 151C is generated using the Tempo-gram Feature, and the multi-dimensional acoustic feature vector 151D is generated using the Tonnetz space geometric representation. The multi-dimensional acoustic feature vector CNN 121A, 121B, 121C, 121D may be trained on multi-dimensional acoustic feature vectors that are generated using the same algorithm as the multi-dimensional acoustic feature vector 151A, 151B, 151C and 151D respectively.

For example, during training of the multi-dimensional acoustic feature vector CNN 121A, the training set may be generated using test voice samples that correspond to a plurality of test group users. These test group users may provide human voices. In an example, known spoofed voice samples that correspond to the test voice samples may be obtained using a first known spoofing method. Examples of spoofing algorithms may include a frame selection algorithm, a voice conversion algorithm that adjusts the first Mel-Cepstral coefficient, a speech synthesis algorithm using hidden Markov model, a voice conversion algorithm implemented using Festvox™ toolkit, a voice conversion algorithm using Gaussian mixture model, a voice conversion model using line spectrum pair in Gaussian mixture instead of using Mel-Cepstral coefficients, a voice conversion algorithm that uses tensor analysis to derive speaker space from matrices, a voice conversion system that uses dynamic kernel partial least squares, a speech synthesis algorithm implemented with MARY Text To Speech System (MaryTTS)™ and the like. In an example, the first spoofing method may include one or more of the spoofing algorithms. The system 100 may be trained using the test voice samples, and the known spoofed voice sample. In an example, multi-dimensional acoustic feature vectors of the pair of human and known spoofed samples may be generated as described above using the multi-dimensional acoustic feature vector extractor 120.

In an example, the multi-dimensional acoustic feature vector CNN builder 116 may train the multi-dimensional acoustic feature vector CNN 151A with multi-dimensional acoustic feature vectors from a known spoofing method such as the voice conversion algorithm that adjusts the first Mel-Cepstral coefficient (CI). In an example, the test voice sample may be generated to represent the same textual phrase as those uttered by the plurality of test users in the test voice samples. Each pair of voices (e.g., the human voice and the known spoofed voice) may be converted into a pair of multi-dimensional acoustic feature vectors. Each multi-dimensional acoustic feature vector in the training set based on the first known spoofing method may be applied to the multi-dimensional acoustic feature vector CNN 151A. The multi-dimensional acoustic feature vector CNN builder 116 may generate a first multi-dimensional acoustic feature vector model for the multi-dimensional acoustic feature vector CNN 151A. In an example, the system 100 may generate a second multi-dimensional acoustic feature vector model for the multi-dimensional acoustic feature vector CNN 151B, a third multi-dimensional acoustic feature vector model for the multi-dimensional acoustic feature vector CNN 151C and a fourth multi-dimensional acoustic feature vector model for the multi-dimensional acoustic feature vector CNN 151D.

The multi-dimensional acoustic feature vector CNN builder 116 may generate an unknown spoofed voice sample that corresponds to the test voice sample using an unknown spoofing algorithm. In an example, an unknown spoofing algorithm may be an algorithm that the plurality of CNNs 121 were not trained for. For example, assume the Gaussian Mixture model or algorithm was not used during training. The unknown spoofed voice samples may be generated using the Gaussian Mixture model. The Gaussian Mixture model is, therefore, an unknown spoofing method to the plurality of multi-dimensional acoustic feature vector CNNs 121. The system 100 may determine an unknown multi-dimensional acoustic feature vector of the unknown spoofed voice sample using the multi-dimensional acoustic feature vector extractor 120. The multi-dimensional acoustic feature vector CNN builder 116 may then apply the unknown multi-dimensional acoustic feature vector to the multi-dimensional acoustic feature vector CNN 121A, 121B, 121C or 121D. The system 100 may determine a probability of spoofing for each multi-dimensional acoustic feature vector from the output (e.g., extracted attribute 160) of the multi-dimensional acoustic feature vector machine learning classifiers such as the multi-dimensional acoustic feature vector CNN 121A, 121B, 121C or 121D. In an example, as described above with reference to FIG. 1, the multi-dimensional acoustic feature vector machine learning classifier may directly determine the probability of spoofing for each multi-dimensional acoustic feature vector. For example, the probability of spoofing for each multi-dimensional acoustic feature vector may be between 0 and 1. In an example, as discussed above the multi-dimensional acoustic feature vector CNN 121A may determine the probability of spoofing using the first multi-dimensional acoustic feature vector model. The multi-dimensional acoustic feature vector CNN 121A may determine the probability of spoofing of the unknown multi-dimensional acoustic feature vector generated using the unknown spoofing algorithm. The multi-dimensional acoustic feature vector CNN builder 116 may determine an overall confidence interval for the probability of spoofing using the first multi-dimensional acoustic feature vector model based on the training set. For example, the confidence interval may be based on a training set from the group of users and the number of errors in identification of the spoofed voice by the multi-dimensional acoustic feature vector CNN 121A for the test set.

In an example, the system 100 may determine the overall probability of spoofing of the voice sample based on the probability of spoofing of each voice sample received from the output of the plurality of multi-dimensional acoustic feature vector CNN's 121. In an example, the overall probability of spoofing of the multi-dimensional acoustic feature vector may be a value between 0 and 1. A probability of spoofing closer to 1 may indicate the multi-dimensional acoustic feature vector is more likely a spoofed multi-dimensional acoustic feature vector. The system 100 may authenticate the user based on the overall probability of spoofing. For example, the system 100 may determine whether the probability of spoofing of the multi-dimensional acoustic feature vector is within a certain threshold. For example, the probability of spoofing may be within a certain threshold when the probability of spoofing is between 0 and 0.8. The system 100 may then authenticate the user. In an example, the authentication module may be part of a different server. For example, the authentication system may be part of a banking server that provides account information. Conversely, the system 100 may determine the voice as a spoofed voice and deny access when the probability of spoofing is not within the threshold.

Figure 3:
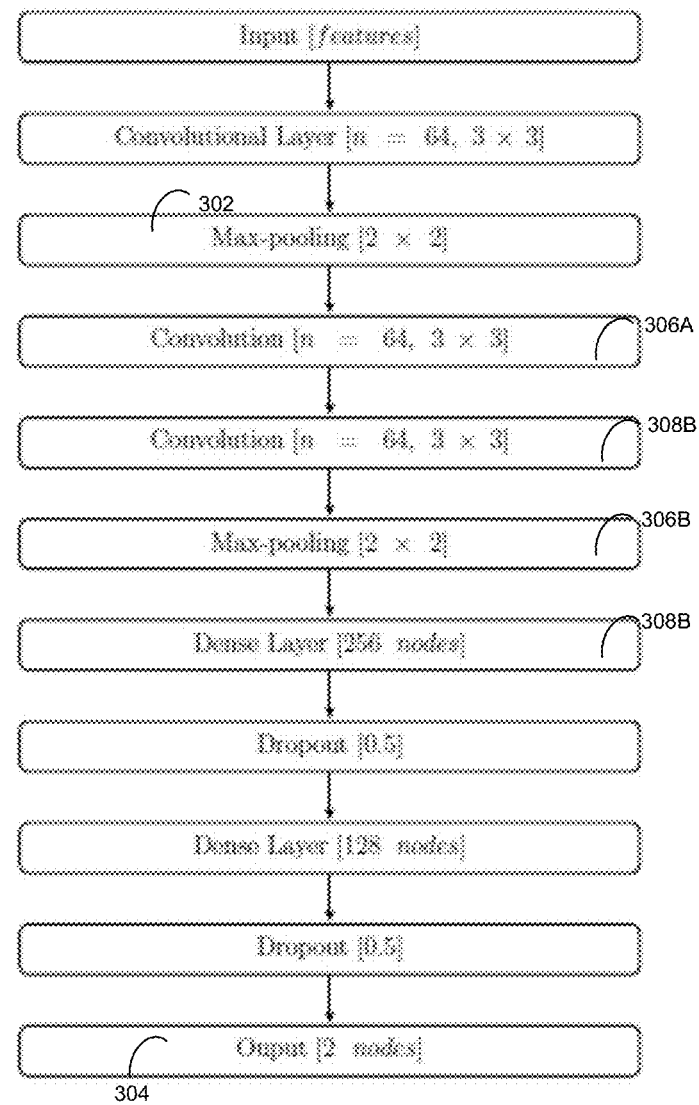
FIG. 3 shows examples of a convolution neural network (CNN), according to an example of the present disclosure.

FIG. 3 shows an example of a CNN used for multi-dimensional acoustic feature vector CNN 121A, 121B, 121C and/or 121D. In an example, the CNN consists of an input layer 302 and an output layer 304. Also, the CNN may include additional convolutional layers (e.g., 306A, 306B), pooling layers (e.g., 308A, 308B), fully connected layers and normalization layers. In an example, the convolution layers may apply a convolution operation to the input and pass the result to the next layer. A pooling layer may combine the outputs locally or globally. The fully connected layer connects one layer to the next layer. In an example, a CNN may also use weights. The CNN may then provide an output at the output layer 304. In an example, the multi-dimensional acoustic feature vector CNN builder 116 may train the CNN as described above with reference to FIG. 2.

In an example, the different layers may act on the output of the previous layers. For example, the layers may identify the spoofing voice attributes in the multi-dimensional acoustic feature vectors for authentication that are similar to spoofing voice attributes in spoofed images or the multi-dimensional acoustic feature vector model.

Figure 4:
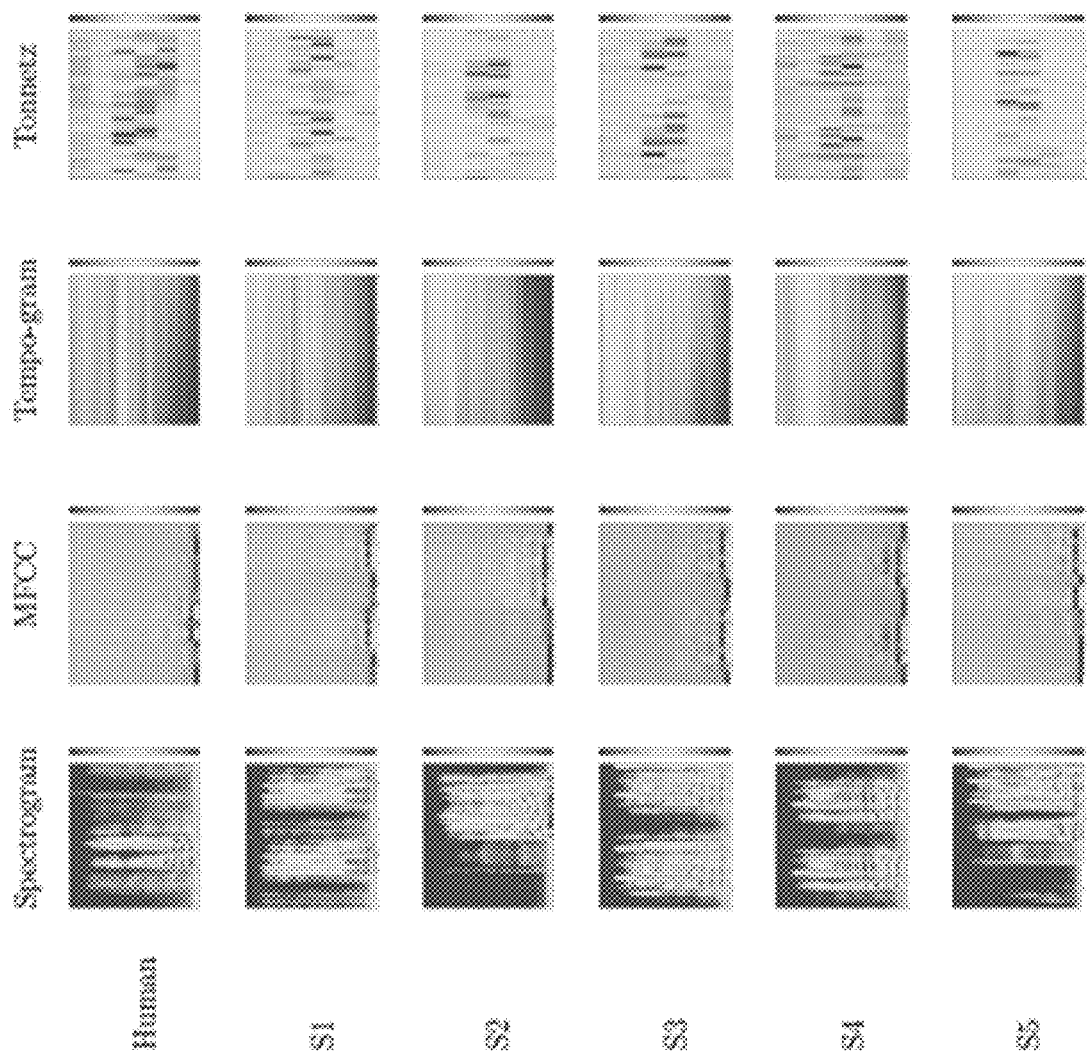
FIG. 4 shows examples of training sets with human multi-dimensional acoustic feature vectors and corresponding known multi-dimensional acoustic feature vectors from a known spoofing method.

FIG. 4 shows examples of training sets with human multi-dimensional acoustic feature vectors and corresponding known multi-dimensional acoustic feature vectors from a known spoofing algorithm as described above with reference to FIG. 2. These test training sets in pairs may be used to train the plurality of multi-dimensional acoustic feature vector CNNs 121 as described above with reference to FIG. 2. For example, the multi-dimensional acoustic feature vector CNN 121A may determine the similarities between the known spoofed multi-dimensional acoustic feature vector using the spoofing method and the multi-dimensional acoustic feature vector attributes of the human voice to generate the multi-dimensional acoustic feature vector model.

In the figure, the multi-dimensional acoustic feature vectors S1-S5 may be generated using known spoofing algorithms such as a voice conversion system using a mapping function for spectral envelopes based on a frame selection algorithm, a voice conversion algorithm which adjusts the Mel-Cepstral coefficient (C1) to perform the unbiased estimation of log spectrum to the target spectral model, a speech synthesis algorithm based on hidden Markov model (HMM) with 20 speaker adaptation utterances, a speech synthesis algorithm based on HMM with 40 speaker adaptation utterances and a voice conversion algorithm implemented with the Festvox™ toolkit respectively.

Figure 5:
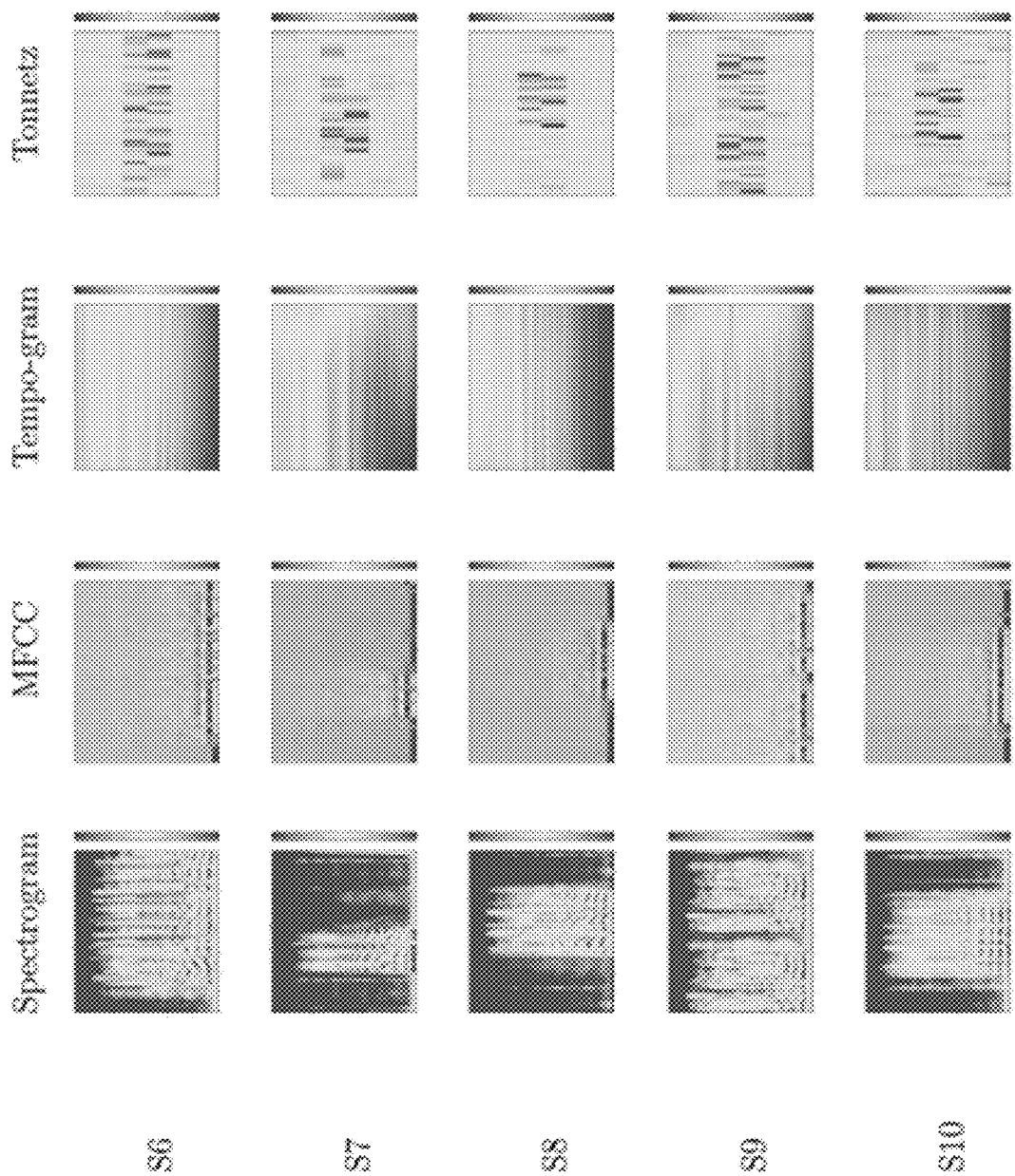
FIG. 5 shows examples of training sets with human multi-dimensional acoustic feature vectors and corresponding unknown multi-dimensional acoustic feature vectors from an unknown spoofing method.

FIG. 5 shows examples of training sets with unknown multi-dimensional acoustic feature vectors from an unknown spoofing algorithm. In an example, the unknown spoofing algorithm is one which is unknown to the multi-dimensional acoustic feature vector CNN. For example, if the multi-dimensional acoustic feature vector CNN is not trained on images generated using the unknown spoofing algorithm the corresponding images generated using the unknown spoofing algorithm are unknown multi-dimensional acoustic feature vectors. In an example, the system 100 may test the multi-dimensional acoustic feature vector model based on the unknown multi-dimensional acoustic feature vectors to determine a confidence interval for the multi-dimensional acoustic feature vector model. For example, the multi-dimensional acoustic feature vector CNN 121A may determine the similarities between the unknown spoofed multi-dimensional acoustic feature vector using the unknown spoofing method and the multi-dimensional acoustic feature vector attributes in the multi-dimensional acoustic feature vector model. The system 100 may then determine the probability of spoofing for the unknown spoofed multi-dimensional acoustic feature vector.

In an example, the confidence interval may be determined based on the error rate of a multi-dimensional acoustic feature vector model when testing the multi-dimensional acoustic feature vector model using the unknown spoofed multi-dimensional acoustic feature vectors. In the figure, the multi-dimensional acoustic feature vectors S6-S10 may be generated using known spoofing algorithms such as a multi-dimensional acoustic feature vector generation algorithm that uses Gaussian mixture model (GMM) of the joint probability density of the source and target features, a voice conversion algorithm similar to S6, but using line spectrum pair (LSP) rather than Mel-Cepstral coefficients, a voice conversion algorithm that uses tensor analysis to derive the speaker space from matrices that represent speaker characteristics, a voice conversion system that uses dynamic kernel partial least squares (DKPLS) technique to address the inherent time-dependency between speech features and improve performance and a speech synthesis algorithm implemented with the open-source MARY Text To Speech System (MaryTTS™) respectively.

FIG. 6 shows an example of the probability of detecting spoofing using the output of the plurality of multi-dimensional acoustic feature vector CNNs 121. For example, the FIG. 6 shows the probability of detecting a spoofed voice from the output for the Spectrogram CNN 121A, MFCC CNN 121B, Tempo-Gram CNN 121C, Tonnetz CNN 121D with a Red Green Blue (RGB) multi-dimensional acoustic feature vector and with a greyscale multi-dimensional acoustic feature vector. The notations Excellent, Good, Acceptable and Low indicate the probability of detecting a voice spoofed using the spoofing algorithms S1 to S10 when applied to the respective CNNs. The post-fix 'A' such as EXCELLENT-A indicates the difference in probability of detecting a spoofed voice when a greyscale multi-dimensional acoustic feature vector and an RGB multi-dimensional acoustic feature vector are used on the same CNN.

The output of the spectrogram CNN 121A (e.g., extracted attribute 160) may be the probability of spoofing for the spectrogram CNN 121A using RGB multi-dimensional acoustic feature vectors. The FIG. 6 shows the relative probabilities of spoofing for the known spoofed voices and unknown spoofed voices using the spectrogram vector CNN 121A. The example illustrates that the human voice is detected accurately, whereas the spectrogram CNN 121A trained on the multi-dimensional acoustic feature vectors generated using the Short-Time Fourier Transformation may have a low confidence interval with voices generated using unknown spoofing algorithms in S8 and S9.

For example, the spectrogram CNN 121A trained using the multi-dimensional acoustic feature vectors generated using the Short-Time Fourier Transformation may have a lower confidence interval, (e.g., may detect spoofed voices less accurately) when applied to spoofed voices are generated using the unknown spoofing algorithms such as voice conversion algorithm that uses tensor analysis to derive the speaker space from matrices that represent speaker characteristics or multi-dimensional acoustic feature vectors generated using a voice conversion system that uses DKPLS to address the inherent time-dependency between speech features to improve spoofing performance. The system 100 may determine the confidence interval for multi-dimensional acoustic feature vector model based on the results shown in FIG. 5.

In an example, the system 100 may determine the confidence interval for multi-dimensional acoustic feature vector models of each of the plurality of multi-dimensional acoustic feature vector CNNs 121. In an example, the multi-dimensional acoustic feature vector of CNN's 121A, 121B, 121C and 121D may have a grey scale multi-dimensional acoustic feature vector to reduce space required and processing resources. In an example, the multi-dimensional acoustic feature vector CNN may be trained using an RGB multi-dimensional acoustic feature vector and corresponding greyscale image. After training, the multi-dimensional acoustic feature vector CNN may use grey scale images to reduce processing time.

In another example, the multi-dimensional acoustic feature vector of CNN's 121A, 121B, 121C and 121D may have an RGB multi-dimensional acoustic feature vector. For example, the Spectrogram CNN 121A using RGB and Grayscale may detect the human voice, and the spoofed voices generated using the spoofing models S1-S5, S6 and S7 with good accuracy, e.g., the confidence interval may be high. However, the spectrogram CNN 121A may have a lower confidence interval for spoofed voices that are generated using the spoofing algorithm S8 and S9. Similarly, the multi-dimensional acoustic feature vector CNN 121A may have a low confidence interval for spoofed voices that are generated using the spoofing algorithm S10.

In an example, the spectrogram CNN 121A may perform better with greyscale multi-dimensional acoustic feature vectors (shown in figure using EXCELLENT-A to distinguish between greyscale and RGB where the results are better for the A version) for the voices that are spoofed using the spoofing algorithm S6 and S7.

In another example, the MFCC CNN 121B may detect the human voice and the spoofed voices generated using the spoofing models S1, S3 and S4 with a high confidence interval, e.g., excellent accuracy. However, MFCC CNN 121B may have a lower confidence interval for detecting spoofed voices that are generated using the spoofing algorithm S2, S5, S7, and S9. Also, the MFCC CNN 121B may have a low confidence interval for detecting spoofed voices that are generated using the spoofing algorithm S6, S8, and S10. In an example, the MFCC CNN 121B may have a low confidence interval when the spoofing algorithms produce a better human voice attribute that may be reflected in the multi-dimensional acoustic feature vector generated using the Mel Spectral Frequency Coefficient. However, the Spectrogram CNN 121A may detect the spoofing in multi-dimensional acoustic feature vectors that are missed by the MFCC CNN 121B because it is trained on multi-dimensional acoustic feature vectors generated using the Short-Time Fourier Transformation which is comparatively less affected by the characteristics of the voice as opposed to multi-dimensional acoustic feature vector CNN 121A.

In an example, the Temp-Gram CNN 121C may more accurately detect the spoofing in greyscale multi-dimensional acoustic feature vectors when detecting spoofed voices that are generated using the spoofing algorithm S7 and S10 compared to RGB multi-dimensional acoustic feature vectors for spoofed voices that are generated using the spoofing algorithm S7 and S10 (shown with an A post-fix to indicate difference between RGB and Grayscale where applicable). In another example, the Temp-Gram CNN 121C may detect spoofed voices that are generated using the spoofing algorithm S1, S3, S4 and S10 with a high confidence interval, detect spoofed voices that are generated using the spoofing algorithm S8 and the human voice with a lower confidence interval and detect spoofed voices that are generated using the spoofing algorithm S2, S5, S7 and S10 with a low confidence interval. Also, the Tempo-Gram CNN 121C may be more accurate when compared to Spectrogram CNN 121A and MFCC CNN 121B for detecting spoofed voices that are generated using the spoofing algorithm S10. Also, the Tempo-Gram CNN 121C may be more accurate at detecting spoofed voices that are generated using the spoofing algorithm S10 when a greyscale multi-dimensional acoustic feature vector is used instead of an RGB multi-dimensional acoustic feature vector.

In another example, the Tonnetz CNN 121D may detect spoofed voices that are generated using the spoofing algorithm S3 and S4 with a high confidence interval, e.g., more accuracy. However, the Tonnetz CNN 121D may have a lower confidence interval for detecting spoofed voices that are generated using the spoofing algorithm S1, S8 and the human voice. Similarly, the confidence interval of the Tonnetz CNN 121D may be lower for detecting spoofed voices that are generated using the spoofing algorithm S2, S5, S7, and S9 compared to spoofed voices that are generated using the spoofing algorithm S1 and S8. Also, the Tonnetz CNN 121D may have a low confidence interval for detecting spoofed voices that are generated using the spoofing algorithm S6 and S10. In an example, the Tonnetz CNN 121D may have a higher confidence interval for detecting spoofed voices that are generated using the spoofing algorithm S10 model when a greyscale multi-dimensional acoustic feature vector is used instead of an RGB multi-dimensional acoustic feature vector. The system 100 may, therefore, use weights based on the confidence interval to improve performance. For example, the plurality of CNN's 121 may have a different confidence interval for different spoofing models. The system 100 may determine an achiever equal error rate (EER) to determine weights that may allow the overall probability of spoofing detection to be more accurate. For system 100 may use greyscale multi-dimensional acoustic feature vectors and/or RGB multi-dimensional acoustic feature vectors to improve the accuracy or may use weights based on the images used to compensate for the inaccuracies. Similarly, the system 100 may determine the weights based on the spoofing algorithms that are encountered when the system 100 is used for securing a computing resource. For example, reports of false authentication may be used to change the weights when spoofing detection fails.

Figure 7:
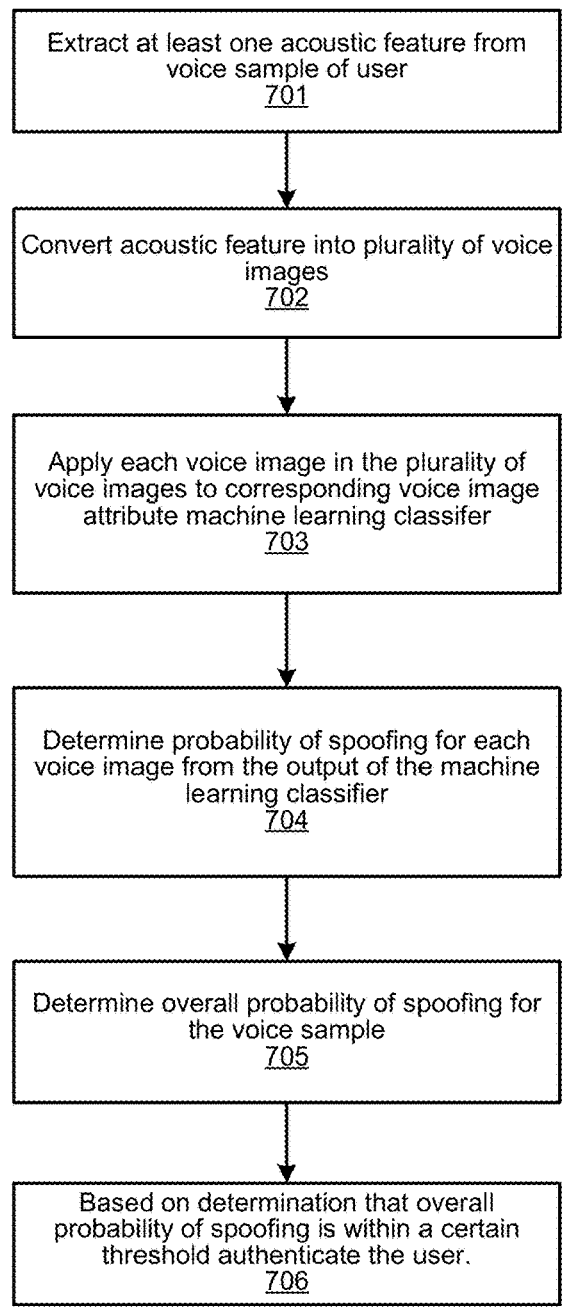
FIG. 7 shows a method of authenticating a user, according to an example of the present disclosure.

FIG. 7 shows an example of a method 700. The method 700 and other methods described herein may be performed by one or more servers or other types of computers including at least one processor executing machine readable instructions embodying the methods. For example, the multi-dimensional acoustic feature vector processing server 130 and/or the multi-dimensional acoustic feature vector matching server 131 shown in FIG. 1 may store machine readable instructions 194 embodying the methods, and processor 191 may execute the machine readable instructions. The method 700 is described by way of example as being performed by the system 100.

At 701, the acoustic filter 144 may extract at least one acoustic feature from a sample voice 150 of a user. For example, the acoustic filter 144 may extract the acoustic feature such as a human voice in the sample voice 150 or an acoustic feature that matches a control voice sample. In an example, a control voice sample may be a voice sample with a text portion that may include a control text spoken by a human voice. The acoustic filter 144 may use frequency matching or match the visual image of the control sample and a visual image of the sample voice 150 to identify the acoustic feature. For example, audio waves may be visually represented as a function of frequency over time. The acoustic filter 144 may look a specific frequency over time that is similar to the control voice sample by comparing the visual images of the frequency over time in part of the sample voice 150.

In an example, to extract an acoustic feature, the acoustic filter 144 may identify a portion of the voice sample that matches a known text in the voice sample and isolates that portion of the voice sample. In an example, a known text may be captured in a control voice sample as spoken by a human being. In another example, the acoustic filter 144 may use a voice attribute such as the frequency of the voice in case the voice samples are text independent, to determine a section of the voice sample that features the user's voice.

In an example, the acoustic filter 144 may determine whether the section of the voice sample matches an existing control voice sample. In response to a determination that the section of the voice sample matches the existing control voice sample, extract the at least one acoustic feature from the section.

At 702, the plurality of multi-dimensional acoustic feature vector extractors 121 may convert the acoustic feature into a plurality of multi-dimensional acoustic feature vectors 151. For example, the multi-dimensional acoustic feature vector extractor 120A may convert the acoustic feature into a multi-dimensional acoustic feature vector 151A base on the Short-Time Fourier Transformation. Similarly, other multi-dimensional acoustic feature vector extractors may be used for the Mel-Cepstral coefficient, the Tonnetz geometrical representation and the like.

At 703, the multi-dimensional acoustic feature vector matching server 131 may apply each multi-dimensional acoustic feature vector in the plurality of multi-dimensional acoustic feature vectors 151 to a corresponding multi-dimensional acoustic feature vector machine learning classifier from the plurality of multi-dimensional acoustic feature vector machine learning classifiers (e.g., the plurality of multi-dimensional acoustic feature vector CNNs 121). For example, the multi-dimensional acoustic feature vector CNN 121A may be trained against multi-dimensional acoustic feature vectors that were converted using the Short-Time Fourier Transformation. The multi-dimensional acoustic feature vector matching server 131 may apply the multi-dimensional acoustic feature vector generated using the Short-Term Fourier Transformation to the multi-dimensional acoustic feature vector CNN 121A.

At 704, the multi-dimensional acoustic feature vector CNN 121A, 121B, 121C or 121D may determine a probability of spoofing for each multi-dimensional acoustic feature vector from an output of the corresponding multi-dimensional acoustic feature vector machine learning classifier. As described above with reference to FIG. 1, the plurality of CNNs 121 may use the process described in steps 162, 163 and 165 that may include the similarity detector 163 (e.g., a layer of the CNN) to determine the probability of spoofing.

At 705, the multi-dimensional acoustic feature vector CNN 121A, 121B, 121C or 121D may determine an overall probability of spoofing for the multi-dimensional acoustic feature vector, based on the probability of spoofing for each multi-dimensional acoustic feature vector. In an example, the probability of spoofing may be determined based on an aggregation of the individual probabilities for each multi-dimensional acoustic feature vector in the plurality of multi-dimensional acoustic feature vectors 151. For example, in FIG. 4, the output (e.g., probabilities of the multi-dimensional acoustic feature vector) from each of the multi-dimensional acoustic feature vectors CNNs 121A, 121B, 121C, and 121D may be combined to determine the overall probability of spoofing for each sample voice.

At 706, the multi-dimensional acoustic feature vector CNN 121A, 121B, 121C or 121D may determine whether the overall probability of spoofing is within a certain threshold. For example, the overall probability of spoofing may be within a certain threshold when the overall probability is between 0 and 0.8. In an example, the certain threshold may be based on the results from the training data and the percentage of false positives. In another example, the certain threshold may be based on a confidence interval.

At 707, the multi-dimensional acoustic feature vector matching server 131 in response to a determination that the overall probability of spoofing is within a certain threshold, may authenticate the user. In an example, the authentication module may be on a different server. For example, a bank may use an authentication module to permit authenticated users access to a bank account. For example, the user may be allowed to access a database or a banking account.

In an example, the multi-dimensional acoustic feature vector matching server 131 may determine an overall probability of matching based on a confidence interval for the multi-dimensional acoustic feature vector models of the plurality of multi-dimensional acoustic feature vector learning classifiers. In an example, the overall probability of spoofing may be based on a selective combination of the probability of spoofing for each multi-dimensional acoustic feature vector in the plurality of multi-dimensional acoustic feature vectors. In another example, the overall probability of spoofing may be based on a weighted combination of the probability of spoofing for each multi-dimensional acoustic feature vector in the plurality of multi-dimensional acoustic feature vectors 151. In an example a selective combination may exclude one or more multi-dimensional acoustic feature vector models/multi-dimensional acoustic feature vector CNNs based on the spoofing method encountered by a production system. For example, a particular spoofing method may be used to defraud banks at a certain period of time. The selective combination may be determined based on the current spoofing method used based on observation of spoofing attempts in the production system.

Figure 8A:
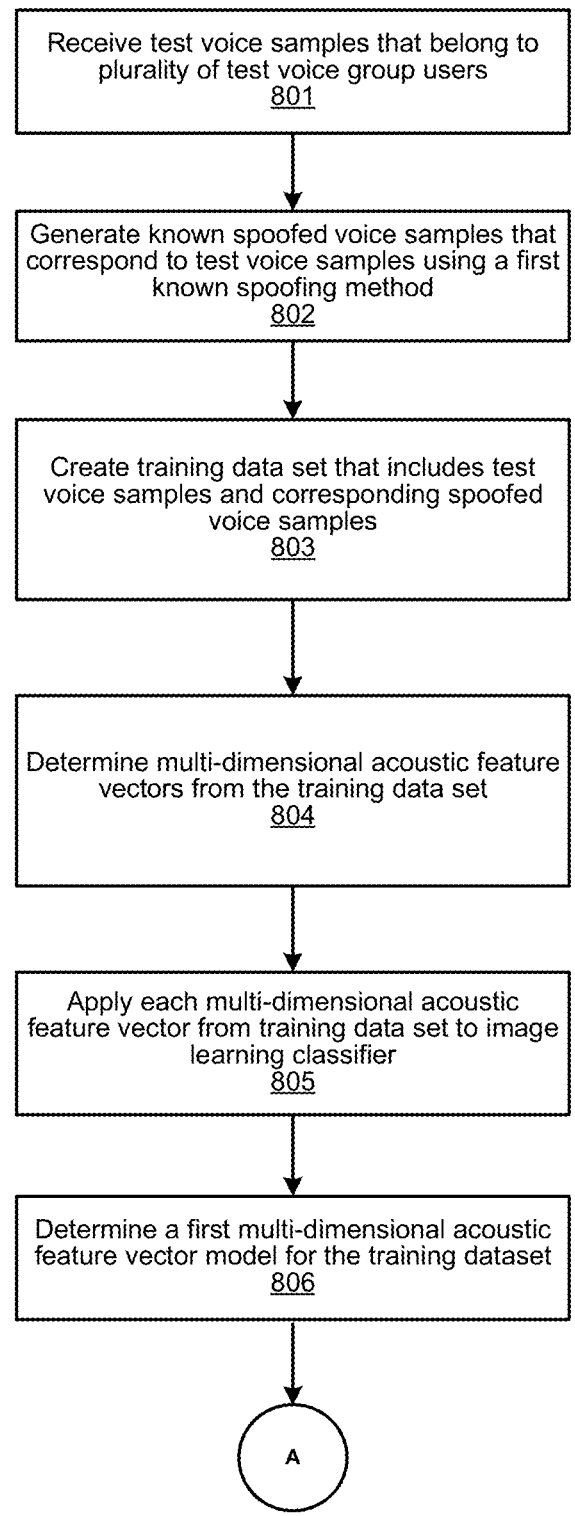
FIGS. 8A and 8B show a method of generating a multi-dimensional acoustic feature vector model, according to an example of the present disclosure.
Figure 8B:
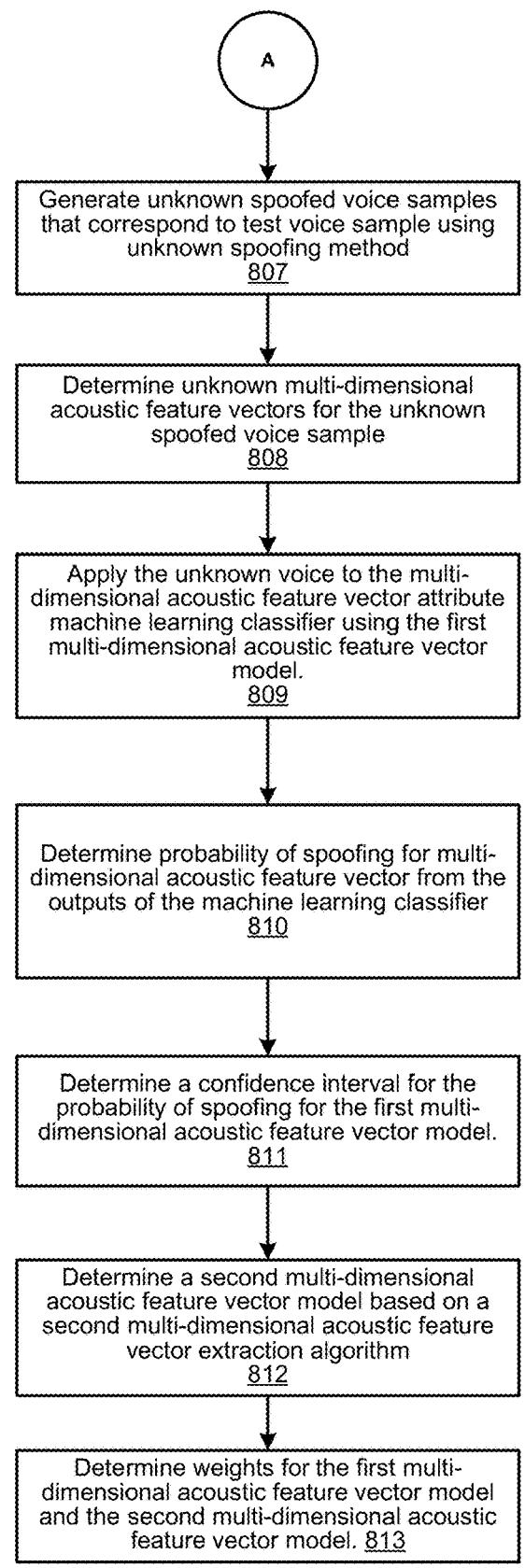

With reference to FIG. 8A and FIG. 8B, there is shown a method of generating a multi-dimensional acoustic feature vector model. At 801, the system 100 may receive test sample voices 150 that correspond to a plurality of test group users.

At 802, the multi-dimensional acoustic feature vector CNN builder 116 may generate a known spoofed voice sample that corresponds to test voice sample using a first known spoofing method. As described above with reference to FIG. 2, the known spoofing method may include a frame selection algorithm, a voice conversion algorithm that adjusts the first Mel-Cepstral coefficient, a speech synthesis algorithm using HMM, a voice conversion algorithm implemented using Festvox™ toolkit, a voice conversion algorithm using GMM, a voice conversion model using LSP in Gaussian mixture instead of using Mel-Cepstral coefficients, a voice conversion algorithm that uses tensor analysis to derive speaker space from matrices, a voice conversion system that uses DKPLS, a speech synthesis algorithm implemented with MARY Text To Speech System (MaryTTS)™ and the like.

At 803, the multi-dimensional acoustic feature vector CNN builder 116 may create a training data set that includes test voice samples and corresponding spoofed voice samples. For example, the system 100 may use the first known spoofing algorithm such as a voice conversion algorithm to determine pairs of test samples with a human voice and corresponding spoofed voice samples.

At 804, the multi-dimensional acoustic feature vector CNN builder 116 may determine a multi-dimensional acoustic feature vector for the training dataset based on a first multi-dimensional acoustic feature vector extraction algorithm. In an example, a multi-dimensional acoustic feature vector may be determined for the human voice and the spoofed voice samples for each of the spoofing algorithms, as described above with reference to FIG. 3. In an example, the first multi-dimensional acoustic feature vector extraction algorithm may be selected from the plurality of multi-dimensional acoustic feature vector extractors 120. The multi-dimensional acoustic feature vector extractor selected may generate the image 151A, 151B, 151C or 151D from the training dataset. The multi-dimensional acoustic feature vector 151A, 151B, 151C or 151D may be generated from the acoustic features in the voice samples.

At 805, the multi-dimensional acoustic feature vector CNN builder 116 may apply each multi-dimensional acoustic feature vector for the training data set to a multi-dimensional acoustic feature vector machine learning classifier such as the multi-dimensional acoustic feature vector CNN 121A, 121B, 121C or 121D. In an example, the system 100 may apply each multi-dimensional acoustic feature vector to the first multi-dimensional acoustic feature vector CNN 121A. For example, apply the human multi-dimensional acoustic feature vector and then the corresponding spoofed multi-dimensional acoustic feature vector from a known spoofing algorithm. In an example, the multi-dimensional acoustic feature vector CNN may be trained based on the multi-dimensional acoustic feature vector extraction algorithm used to determine the multi-dimensional acoustic feature vector, e.g., the Short-Time Fourier Transformation multi-dimensional acoustic feature vector may be applied to the first multi-dimensional acoustic feature vector CNN 121A as shown in FIG. 2, and the others to their corresponding multi-dimensional acoustic feature vector CNNs.

At 806, the system 100 may determine a first multi-dimensional acoustic feature vector model for the training dataset. In an example, the system 100 may determine a multi-dimensional acoustic feature vector model for use with a trained CNN such as the multi-dimensional acoustic feature vector CNN 121A. The trained multi-dimensional acoustic feature vector CNN and/or the multi-dimensional acoustic feature vector model may include information such as the voice attributes that indicate spoofing, the location of the multi-dimensional acoustic feature vector attribute that indicates spoofing. As described above with reference to FIG. 1, the CNN may use the similarly matching to determine the voice attribute features or generate the extracted attributes 160.

At 807, the multi-dimensional acoustic feature vector CNN builder 116 may generate an unknown spoofed voice sample that corresponds to test voice sample using an unknown spoofing method. In an example, the system 100 may determine an unknown spoofed voice sample using an algorithm the plurality of multi-dimensional acoustic feature vector CNNs 121 is not trained for. As described above with reference to FIG. 2, the unknown spoofed algorithm may be an algorithm that was not used during the training of the multi-dimensional acoustic feature vector CNN.

At 808, the multi-dimensional acoustic feature vector CNN builder 116 may determine an unknown multi-dimensional acoustic feature vector of the unknown spoofed voice sample that is spoofed using the unknown spoofed algorithm. The system 100 may determine the plurality of unknown multi-dimensional acoustic feature vectors using the plurality of multi-dimensional acoustic feature vector extractors 120. A plurality of multi-dimensional acoustic feature vector extractors 120 may be used to extract the plurality of unknown multi-dimensional acoustic feature vectors.

At 809, the multi-dimensional acoustic feature vector CNN builder 116 may apply the unknown multi-dimensional acoustic feature vector to the corresponding multi-dimensional acoustic feature vector machine learning classifier. For example, the unknown multi-dimensional acoustic feature vector may be applied to the multi-dimensional acoustic feature vector CNN 121A using the first multi-dimensional acoustic feature vector model. In an example, the CNN 121A may be chosen from the plurality of multi-dimensional acoustic feature vector CNN's based on the multi-dimensional acoustic feature vector extractor algorithm used for generating the multi-dimensional acoustic feature vector.

At 810, the system 100 may determining a probability of spoofing for each multi-dimensional acoustic feature vector from an output of the multi-dimensional acoustic feature vector machine learning classifier (e.g., the multi-dimensional acoustic feature vector CNN 121A, 121B, 121C or 121D). The multi-dimensional acoustic feature vector CNN builder 116 may determine a probability of spoofing for each multi-dimensional acoustic feature vector in the plurality of multi-dimensional acoustic feature vectors 151. For example, as described above with reference to FIG. 2, the corresponding CNN's may be trained on multi-dimensional acoustic feature vectors generated using a particular multi-dimensional acoustic feature vector extractor algorithm such as Mel-Cepstral coefficient.

At 811, the multi-dimensional acoustic feature vector CNN builder 116 may determine a confidence interval for the probability of spoofing for the first multi-dimensional acoustic feature vector model. In an example, the system 100 may determine a confidence interval for the probability of spoofing for the first multi-dimensional acoustic feature vector model based on the results (e.g., false positives) of the output of the multi-dimensional acoustic feature vector CNN 121A, 121B, 121C or 121D when the unknown spoofing multi-dimensional acoustic feature vectors is applied. For example, the false positives or the failure to detect a spoofed voice may be used to determine the confidence interval.

In an example, the multi-dimensional acoustic feature vector CNN 121A,12B, 121C, 121D may be further trained using the unknown spoofing samples. Also, the multi-dimensional acoustic feature vector CNN builder 116 may build a second multi-dimensional acoustic feature vector model based on the second set of known multi-dimensional acoustic feature vector and this second multi-dimensional acoustic feature vector model may be tested against unknown multi-dimensional acoustic feature vectors that correspond to the sample voices of the group of users. In an example, the multi-dimensional acoustic feature vector CNN builder 116 may determine the weights for the first multi-dimensional acoustic feature vector model and the second multi-dimensional acoustic feature vector model. For example, the first multi-dimensional acoustic feature vector model may be less accurate compared to the second multi-dimensional acoustic feature vector model. The overall probability may be determined using weights to account for accuracy and the confidence interval of the multi-dimensional acoustic feature vector models.

Optionally, at 812, the multi-dimensional acoustic feature vector CNN builder 116 may determine a second multi-dimensional acoustic feature vector model based on a second voice extraction algorithm. For example, the second voice extraction algorithm may be at least one of a Mel-Frequency Cepstral Coefficient Transformation, a Tempogram Feature and/or a Tonnetz space Geometric representation algorithm.

Optionally, at 813, the multi-dimensional acoustic feature vector CNN builder 116 may determine weights for the first multi-dimensional acoustic feature vector model and the second multi-dimensional acoustic feature vector model. In an example, the multi-dimensional acoustic feature vector CNN builder 116 may use a selective combination of the probability of spoofing determined using each of the plurality of multi-dimensional acoustic feature vector CNNs 121. For example, the first multi-dimensional acoustic feature vector CNN may have difficulty determining whether a voice is spoofed when a certain voice spoofing algorithm is used. The CNN builder 116 may determine a selective combination of the multi-dimensional acoustic feature vector CNN's based on the spoofing methods that are reported in a production system.

Figure 9:
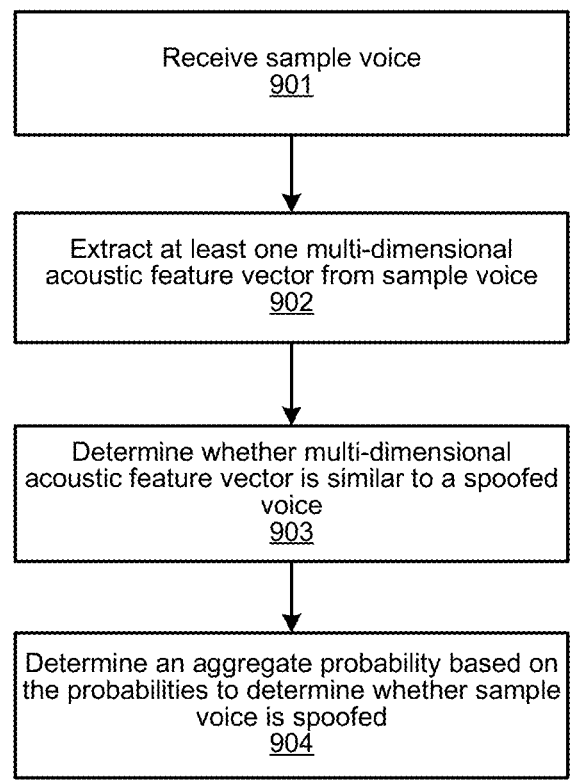
FIG. 9 shows a method of detecting spoofing, according to an example of the present disclosure.

FIG. 9 shows an example of a method 900. The method 900 may be performed by the system 100 or another system to perform voice verification. The method 900 is described by way of example as being performed by the system 100 and may be performed by other systems. The method 900 and other methods described herein may be performed by one or more servers or other types of computers including at least one processor executing machine readable instructions embodying the methods. For example, the multi-dimensional acoustic feature vector processing server 130 and/or the multi-dimensional acoustic feature vector matching server 131 shown in FIG. 8 may store machine readable instructions 194 embodying the methods, and processor 191 may execute the machine readable instructions. Also, one or more of the steps of the method 900 and steps of other methods described herein may be performed in a different order than shown or substantially simultaneously.

At step 901, the system 100 receives the sample voice 150. In an example, the sample voice 150 may be captured and sent to the system 100, via a network interface (e.g., I/O interface 192), connecting a computer of the system 100 to the network 119.

At step 902, the system 100 extracts at least one multi-dimensional acoustic feature vector from the sample voice 150. For example, the system 100 may extract the multi-dimensional acoustic feature vector based on frequency. Examples of frequency-based features include Mel-frequency spectrum, Mel-frequency cepstral coefficients, bark frequency cepstral coefficient, phase features and the like. In another example, the system 100 may extract the multi-dimensional acoustic feature vector based on psychoacoustics features. Examples of psychoacoustic features include roughness, loudness, and sharpness. In another example, the system 100 may extract the multi-dimensional acoustic feature vector based on pace features. Examples of pace features include onset, beats-per-minute, and tempo. In an example, the system 100 may extract the multi-dimensional acoustic feature vector based on chroma features. Examples of chroma features may include Tonnetz. In another example, the system 100 may extract waveform features such as zero-crossing-rates, skewness, kurtosis and the like.

In an example, the system 100 may use a multi-dimensional acoustic feature vector extraction algorithm such as the short-time Fourier transform spectrogram, the Mel-frequency cepstral coefficients, the tempo-gram and the Tonnetz to extract the multi-dimensional acoustic feature vector from the sample voice 150.

At step 903, the system 100 may use machine learning image classifiers such as convolutional neural networks to determine whether the sample voice 150 is similar to the original voice. In an example, the system 100 may use machine learning algorithms on the four multi-dimensional acoustic feature vectors generated using the voice extraction algorithms namely short-time Fourier transform spectrogram, Mel-frequency cepstral coefficients, tempo-gram and Tonnetz to determine a probability that the sample voice 150 is similar a spoofed voice.

At step 904, the system 100 may determine an aggregate probability for the four multi-dimensional acoustic feature vectors generated using the multi-dimensional acoustic feature vector extraction algorithms such as short-time Fourier transform spectrogram, Mel-frequency cepstral coefficients, tempo-gram and Tonnetz to determine whether the sample voice 150 is spoofed.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A machine learning multi-dimensional acoustic feature vector authentication system comprising:
    at least one processor to execute machine readable instructions stored on at least one non-transitory computer readable medium;
    at least one data storage to store a plurality of multi-dimensional acoustic feature vector machine learning classifiers,
        wherein the plurality of multi-dimensional acoustic feature vector machine learning classifiers comprise convolutional neural networks trained to identify multi-dimensional acoustic feature vectors;
    wherein the at least one processor is to execute machine readable instructions to:
        extract at least one acoustic feature from a voice sample of a user;
        convert the acoustic feature into a plurality of multi-dimensional acoustic feature vectors;
        apply each multi-dimensional acoustic feature vector in the plurality of multi-dimensional acoustic feature vectors to a corresponding multi-dimensional acoustic feature vector machine learning classifier from the plurality of multi-dimensional acoustic feature vector machine learning classifiers;
        determine a probability of spoofing for each multi-dimensional acoustic feature vector from an output of the corresponding multi-dimensional acoustic feature vector machine learning classifier;
        determine an overall probability of spoofing for the voice sample, based on the probability of spoofing for each multi-dimensional acoustic feature vector;
        determine whether the overall probability of spoofing is within a certain threshold; and
        in response to a determination that the overall probability of spoofing is within the certain threshold, authenticate the user.

2. The machine learning multi-dimensional acoustic feature vector authentication system of claim 1, wherein to convert the acoustic feature into a plurality of multi-dimensional acoustic feature vectors, the at least one processor is to:
    determine at least one of a frequency-based features, a psychoacoustic feature, a pace feature and a chroma feature of the acoustic feature.

3. The machine learning multi-dimensional acoustic feature vector authentication system of claim 1, wherein to extract at least one acoustic feature from a voice sample of a user, the at least one processor is to:
    determine a section of the voice sample that features the users voice;
    determine whether the section of the voice sample matches an existing control voice sample; and
    in response to a determination that the section of the voice sample matches the existing control voice sample, extract the at least one acoustic feature from the section.

4. The machine learning multi-dimensional acoustic feature vector authentication system of claim 1, wherein the certain threshold is based on confidence intervals for multi-dimensional acoustic feature vector models of the plurality of multi-dimensional acoustic feature vector machine learning classifiers.

5. The machine learning multi-dimensional acoustic feature vector authentication system of claim 1, wherein the multi-dimensional acoustic feature vectors are in greyscale.

6. The machine learning multi-dimensional acoustic feature vector authentication system of claim 1, wherein the multi-dimensional acoustic feature vectors are in Red Green Blue (RGB) colors.

7. The machine learning multi-dimensional acoustic feature vector authentication system of claim 1, wherein to determine the acoustic feature, the at least one processor is to:
    identify a portion of the voice sample that matches a known text in the voice sample; and
    isolate the portion of the voice sample.

8. The machine learning multi-dimensional acoustic feature vector authentication system of claim 1, wherein the at least one processor is to:
    receive a test voice sample that correspond to a test group user;
    generate known spoofed voice samples that correspond to the test voice sample using a known spoofing method;
    create a training dataset that includes the test voice sample and the known spoofed voice samples;
    determine multi-dimensional acoustic feature vectors for the training dataset;

apply each multi-dimensional acoustic feature vector for the training dataset to a multi-dimensional acoustic feature vector learning classifier being trained from the plurality of multi-dimensional acoustic feature vector machine learning classifiers; and determine a multi-dimensional acoustic feature vector model for the multi-dimensional acoustic feature vectors.

9. The machine learning multi-dimensional acoustic feature vector authentication system of claim 8, wherein to test a multi-dimensional acoustic feature vector machine learning classifier in the plurality of multi-dimensional acoustic feature vector machine learning classifiers, the at least one processor is to:

generate unknown spoofed voice samples that correspond to the test voice sample using an unknown spoofing method;

determine unknown multi-dimensional acoustic feature vectors of the unknown spoofed voice samples;

apply each unknown multi-dimensional acoustic feature vector from the unknown multi-dimensional acoustic feature vectors to the multi-dimensional acoustic feature vector machine learning classifier using the multi-dimensional acoustic feature vector model;

determine a probability of spoofing for each multi-dimensional acoustic feature vector from the output of the multi-dimensional acoustic feature vector machine learning classifier; and determine a confidence interval for the probability of spoofing for the multi-dimensional acoustic feature vector model.

10. The machine learning multi-dimensional acoustic feature vector authentication system of claim 1, wherein to determine an overall probability of spoofing for the voice sample, the at least one processor is to:

determine a selective combination for the probability of spoofing for each multi-dimensional acoustic feature vector in the plurality of multi-dimensional acoustic feature vectors.

11. The machine learning multi-dimensional acoustic feature vector authentication system of claim 1, wherein to determine an overall probability of spoofing for the voice sample, the at least one processor is to:

apply a weighting to the probability of spoofing for each multi-dimensional acoustic feature vector in the plurality of multi-dimensional acoustic feature vectors.

12. A machine learning multi-dimensional acoustic feature vector authentication system comprising:

at least one processor to execute machine readable instructions stored on at least one non-transitory computer readable medium;

at least one data storage to store a plurality of multi-dimensional acoustic feature vector machine learning classifiers trained to identify multi-dimensional acoustic feature vectors;

wherein the at least one processor is to execute the machine readable instructions to:

extract at least one acoustic feature from a voice sample of a user;

convert the at least one acoustic feature into a plurality of multi-dimensional acoustic feature vectors using a Short-Time Fourier Transformation, a Mel-Frequency Cepstral Coefficient Transformation, a Tempo-gram Feature and a Tonnetz space Geometric representation algorithm;

apply each multi-dimensional acoustic feature vector in the plurality of multi-dimensional acoustic feature vectors to a corresponding multi-dimensional acoustic feature vector machine learning classifier from the plurality of multi-dimensional acoustic feature vector machine learning classifiers, wherein the plurality of multi-dimensional acoustic feature vector machine learning classifiers is trained to detect multi-dimensional acoustic feature vectors that are converted using the Short-Time Fourier Transformation, the Mel-Frequency Cepstral Coefficient Transformation, the Tempo-gram Feature and the Tonnetz space geometric representation;

determine a probability of spoofing for each multi-dimensional acoustic feature vector from an output of the corresponding multi-dimensional acoustic feature vector machine learning classifier;

determine a confidence interval for the probability of spoofing for each multi-dimensional acoustic feature vector;

determine a weight for the probability of spoofing for each multi-dimensional acoustic feature vector based on the confidence interval;

determine an overall probability of spoofing for the voice sample, based on a weighted combination of the probability of spoofing for each multi-dimensional acoustic feature vector in the multi-dimensional acoustic feature vectors, wherein the weighted combination is based on the weight for each multi-dimensional acoustic feature vector;

determine whether the overall probability of spoofing is within a certain threshold; and in response to a determination that the overall probability of spoofing is within the certain threshold, authenticate the user.

13. The machine learning multi-dimensional acoustic feature vector authentication system of claim 12, wherein to extract at least one acoustic feature from a voice sample of a user, the at least one processor is to:

determine whether a section of the voice sample matches an existing control voice sample; and in response to a determination that the section of the voice sample matches the existing control voice sample, extract the at least one acoustic feature from the section.

14. The machine learning multi-dimensional acoustic feature vector authentication system of claim 12, wherein the certain threshold is based on confidence intervals for multi-dimensional acoustic feature vector models of the plurality of multi-dimensional acoustic feature vector machine learning classifiers.

15. The machine learning multi-dimensional acoustic feature vector authentication system of claim 12, wherein the multi-dimensional acoustic feature vectors are in greyscale.

16. The machine learning multi-dimensional acoustic feature vector authentication system of claim 12, wherein the multi-dimensional acoustic feature vectors are in Red Green Blue (RGB) colors.

17. The machine learning multi-dimensional acoustic feature vector authentication system of claim 12, wherein to determine the acoustic feature, the at least one processor is to:

identify a portion of the voice sample that matches a known text in the voice sample; and isolate the portion of the voice sample.

18. A method of training a machine learning multi-dimensional acoustic feature vector authentication system, the method comprising:

receiving test voice samples that correspond to a plurality of test group users;

determining known spoofed voice samples that correspond to the test voice samples using a first known spoofing method;

determining a training dataset that includes the test voice samples and the corresponding known spoofed voice samples;

determining multi-dimensional acoustic feature vectors for the training dataset based on a first multi-dimensional acoustic feature vector extraction algorithm;

applying each multi-dimensional acoustic feature vector for the training dataset to a multi-dimensional acoustic feature vector machine learning classifier;

determining a first multi-dimensional acoustic feature vector model for the training dataset;

determining an unknown spoofed voice sample that corresponds to a test voice sample of the test voice samples using an unknown spoofing method;

determining an unknown multi-dimensional acoustic feature vector of the unknown spoofed voice sample;

applying the unknown multi-dimensional acoustic feature vector to the multi-dimensional acoustic feature vector machine learning classifier using the first multi-dimensional acoustic feature vector model;

determining a probability of spoofing for each multi-dimensional acoustic feature vector from an output of the multi-dimensional acoustic feature vector machine learning classifier; and determining a confidence interval for the probability of spoofing for the first multi-dimensional acoustic feature vector model.

19. The method of claim 18, comprising:

determining known spoofed voice samples that correspond to the test voice samples using a second voice extraction algorithm; and determining a second multi-dimensional acoustic feature vector model and a second confidence interval for the probability of spoofing for the second multi-dimensional acoustic feature vector model.

20. The method of claim 19, comprising:

determining weights for the first multi-dimensional acoustic feature vector model and the second multi-dimensional acoustic feature vector model to determine an overall probability of spoofing.

* * * * *